US011321985B2

(12) United States Patent
Kakkar

(10) Patent No.: US 11,321,985 B2
(45) Date of Patent: May 3, 2022

(54) COUNTERFEIT DETECTION IN BRIGHT ENVIRONMENT

(71) Applicant: Lumileds LLC, San Jose, CA (US)

(72) Inventor: Varun Dev Kakkar, Aachen (DE)

(73) Assignee: LUMILEDS LLC, San Jose, CA (US)

( * ) Notice: Subject to any disclaimer, the term of this patent is extended or adjusted under 35 U.S.C. 154(b) by 189 days.

(21) Appl. No.: 16/755,007

(22) PCT Filed: Sep. 14, 2018

(86) PCT No.: PCT/EP2018/074964
§ 371 (c)(1),
(2) Date: Apr. 9, 2020

(87) PCT Pub. No.: WO2019/072492
PCT Pub. Date: Apr. 18, 2019

(65) Prior Publication Data
US 2020/0312075 A1  Oct. 1, 2020

(30) Foreign Application Priority Data

Oct. 10, 2017 (EP) ..................................... 17195699

(51) Int. Cl.
G07D 7/128 (2016.01)
H04N 5/232 (2006.01)
(Continued)

(52) U.S. Cl.
CPC .......... G07D 7/128 (2013.01); G06K 9/6215 (2013.01); G06T 5/50 (2013.01); G06V 10/143 (2022.01);
(Continued)

(58) Field of Classification Search
CPC ..... G07D 7/128; G06K 9/2018; G06K 9/6215
See application file for complete search history.

(56) References Cited

U.S. PATENT DOCUMENTS

2004/0100563 A1* 5/2004 Sablak ............... H04N 5/23299
348/211.4
2005/0231590 A1* 10/2005 Iwasaki ............... H04N 13/218
348/47
(Continued)

OTHER PUBLICATIONS

Kari Pulli et al.: Mobile panoramic imaging system, Computer Vision and Pattern Recognition Workshops (CVPRW), 2010 IEEE Computer Society Confererenceon, IEEE, Piscataway, NJ, USA, Jun. 13, 2010 (Jun. 13, 2010), pp. 108-115, XP031728974, ISBN: 978-1-4224-7029-7 (Year: 2010).*
(Continued)

Primary Examiner — Myron Wyche
(74) Attorney, Agent, or Firm — Servilla Whitney LLC

(57) ABSTRACT

The invention describes a method (100) for counterfeit detection using a portable device (1) with installed counterfeit detection application, to a data carrier (30) comprising this counterfeit detection application, to the portable device (1) used in this method and to a cover (50) comprising guiding structures to perform this method comprising the steps of taking multiple overlapping pictures (110) from at least a portion of the object (10) with the camera (2) of the portable device (1) positioned in front of the object (10) during relatively moving (RM) the portable device with respect to and (1) along the object (10); combining (120) all taken pictures to a single combined image of at least the portion of the object (10) with increased resolution by the counterfeit detection application (4) executed on the portable device (1); applying image processing (130) to the combined image by the counterfeit detection application (4) providing an improved image with improved properties compared to the combined image to order to visualize or enhance the hidden features of the object (10) comprising an increased contrast in the infrared and/or ultraviolet wavelength range being transmitted by the adapted band pass
(Continued)

filter (3); and comparing (140) the improved image with the visualized or enhanced hidden features of the object (10) with a reference image of the object (10) comprising the hidden features by the counterfeit detection application (4) to provide (200) an authentication result for the performed counterfeit detection.

14 Claims, 4 Drawing Sheets

(51) Int. Cl.
*G06K 9/62* (2022.01)
*G06T 5/50* (2006.01)
*H04N 5/225* (2006.01)
*G06V 10/143* (2022.01)

(52) U.S. Cl.
CPC ......... *H04N 5/2253* (2013.01); *H04N 5/2256* (2013.01); *H04N 5/23299* (2018.08); *G06T 2207/10048* (2013.01); *G06T 2207/20221* (2013.01); *G07D 2207/00* (2013.01)

(56) References Cited

U.S. PATENT DOCUMENTS

2013/0034290 A1* 2/2013 Lee .................. G07D 7/202
                                                            382/135
2016/0093412 A1 3/2016 Liao et al.

OTHER PUBLICATIONS

Del Gallego, Neil Patrick, et al., "Multiple-image super-resolution on mobile devices: an image warping approach", EURASIP Journal on Image and Video Processing, (2017) 2017:8, 16 pages.
Hildebrand, Roland , et al., "Smartphones as Smart Cameras—Is It Possible?", Nov. 1, 2012, Retrieved from the Internet: <URL:https://www.researchgate.net/Publication/266673038_Smartphones_as_Smart_Cameras_Is_It_Possible> [retrieved on Mar. 28, 2018], 16 pages.
Lee, Ji Woo, et al., "A Survey on Banknote Recognition Methods by Various Sensors", Sensors, vol. 17, No. 2, Feb. 8, 2017, p. 313, 34 pages.
Pulli, Kari, et al., "Mobile Panoramic Imaging System", Computer Vision and Pattern Recognition Workshops (CVPRW), 2010 IEEE Computer Society Conference, IEEE, Jun. 13, 2010, pp. 108-115.
PCT International Search Report and Written Opinion in PCT/EP2018/074964 dated Dec. 6, 2018, 16 pages.

* cited by examiner

COUNTERFEIT DETECTION IN BRIGHT ENVIRONMENT

CROSS-REFERENCE TO RELATED APPLICATIONS

This application is the National Stage entry of PCT/EP2018/074964, filed on Sep. 14, 2018, which claims priority to U.S. Provisional Application Ser. No. 17195699.8, filed Oct. 10, 2017, the entire disclosures of which are hereby incorporated by reference herein.

FIELD OF THE INVENTION

The invention relates to a method for counterfeit detection using a portable device with installed counterfeit detection application, to a data carrier comprising this counterfeit detection application, to the portable device used in this method and to a cover comprising guiding structures to perform this method.

BACKGROUND OF THE INVENTION

There are many counterfeit detection devices in the market, e.g. for banknotes, passports etc. As security features, banknotes of mostly all countries have hidden Infrared (IR) and UV (ultraviolet) features. More and more countries are now adding these features to their banknotes, government documents (like passports, driving license etc.). Labels on the products and books also sometimes have these features to avoid counterfeit.

The challenge in detecting hidden IR and UV features is that they are nicely visible in dark (or low ambient white light) in the presence of IR and UV light. As the ambient white light levels increase the contrast of visible IR/UV features decreases quite rapidly. In bright ambient environments IR/UV features are quite dull and barely or not visible. Conventional counterfeit detection devices for visual inspection generally use a cover to create shadow over the object (banknote, driving license etc.) in combination with light sources providing bright IR/UV light to make hidden features visible. Therefore counterfeit detection techniques have not been developed and evolved in mobile phones for use in bright environment.

However mobile phones and other portable devices are widely spread around the world, portable, small and easy to handle. Consequently, there is a need for portable devices, e.g. mobile phones, enabling counterfeit detection not limited to certain locations and also in bright environments.

SUMMARY OF THE INVENTION

It is an object of the present invention to provide a method to enable counterfeit detection in bright environments in an easy and reliable way not limited to certain locations.

The invention is defined by the independent claims. The dependent claims define advantageous embodiments.

According to a first aspect a method for counterfeit detection using a portable device is provided. The portable device comprises a camera, an adapted band pass filter arranged in the light path of the camera and a counterfeit detection application installed on the portable device to check an object comprising hidden features suitable for the counterfeit detection against counterfeiting, where the adapted band pass filter comprising narrow band transmission windows in the infrared and/or ultraviolet wavelength range and a transmission window covering the visible wavelength range. The method comprises the steps of taking multiple overlapping pictures from at least a portion of the object with the camera of the portable device positioned in front of the object during relatively moving the portable device along the object;

combining all taken pictures to a single combined image of at least the portion of the object with increased resolution by the counterfeit detection application executed on the portable device;

applying image processing to the combined image by the counterfeit detection application providing an improved image with improved properties compared to the combined image to order to visualize or enhance the hidden features of the object comprising an increased contrast in the infrared and/or ultraviolet wavelength range being transmitted by the adapted band pass filter; and comparing the improved image with the visualized or enhanced hidden features of the object with a reference image of the object comprising the hidden features by the counterfeit detection application to provide an authentication result for the performed counterfeit detection.

The camera might be a standard camera for portable devices. The adapted band pass filter of the portable device is arranged within the light pass within the portable device. The adaptive band pass filter might be an additional component within the light pass or might be applied on top of one of the lenses of the camera. The transmission window for visible light may extend from 380 nm to 780 nm. The infrared transmission window might be located around 850 nm or 940 nm with a window range of 10-80 nm depending on the application and the bandwidth of the emission spectrum in case of an illuminating light source in order to obtain a narrow transmission window. The portable device may comprise specific illumination light sources (illuminators) to additionally illuminate the object, which might be LEDs, VCSELs (Vertical Cavity Surface Emitting Laser) or any semiconductor light source. For example the bandwidth of the optical filter might be 10 nm in case of VCSELs or 80 nm or wider in case of LEDs. The combining step leads to a complete high resolution image of the object providing best possibilities to distinguish between counterfeit and non-counterfeit objects using available reference images.

Relative movement between portable device and object denote either moving the portable device along non-moving object or moving the object along the non-moving portable device or a combination of moving the portable device along the moving object.

The method according to the present invention enables counterfeit detection in bright environments in an easy and reliable way not limited to certain locations.

In an embodiment of the method the image processing is applied by the counterfeit detection application with respect to at least one element of the group of elements comprising grayscale, contrast, brightness and application of high frequency pass filters to order to visualize or enhance the hidden features of the object. When applying the image processing to these parameters hidden infrared and/or ultraviolet features of the object are clearly visible in the final image.

In another embodiment the method further comprises the step of obtaining the to-be-compared reference image from a library comprising multiple different reference images. When the reference image is obtained from a library, the content of reference images can be updated separately from the content available on the portable device ensuring comparison of the improved image always with the latest version of reference images to obtain the most reliable authentication results. In a preferred embodiment the reference image or the library is installed on the portable device or the reference image is downloaded from the library as an external library via the internet. This improves the availability of the reference image at outdoor or remote locations.

In another embodiment the method further comprises the steps of
- Performing a similarity check between the combined image and the available reference images in the library by the counterfeit detection application; and
- Using the reference image of the library providing a highest degree of similarity above a predefined threshold with the combined image for performing the comparing step.

The performed similarity check ensures that the reference image used for the comparison is the image corresponding to the improved image taken from the object in order to obtain a correct authentication result. A wrong reference image would result in wrong authentication results.

In another embodiment of the method the step of taking multiple overlapping images is executed and controlled by the counterfeit detection application. The execution by the application avoids manual handling errors.

In another embodiment the method further comprises the step of shielding part of ambient light by placing the portable device in close distance to the object between the object and the ambient light source, where the closest possible distance is determined by the depth of focus of the camera of the portable device. A portable device in close distance to the object increases the intensity of the infrared and/or ultraviolet irradiance to the object relative to the ambient light due to the shading of the ambient light by the portable device decreasing the amount of visible light reaching the camera. As a combined effect the overall contrast of infrared/ultraviolet features on the object will increase significantly. For any distance larger than the minimum distance the counterfeit detection application work well.

In another embodiment of the method the step of combining all taken pictures to the single combined image comprises the step of merging the multiple images to the same distance and/or tilting angle between camera and object by the counterfeit detection application. This improves the quality of the combined image resulting in better comparison results to the reference image. For example, small hand movements or deviations in distance or tilting angle between camera and object can be corrected by software or image processing not affecting the usability of the counterfeit detection application.

In another embodiment the method further comprises the step of placing the portable device in a guiding structure in order to maintain a defined distance and tilting angle between the camera of the portable device facing towards the object and the object for the step of taking the multiple overlapping pictures. This step improves the image quality of each picture and allows a combining process performed with better quality. A suitable guiding structure might be humps, bumps or bulges of a height equal or larger than a minimum focal length of the camera arranged on the housing of the portable device on the camera side closed to the edge of this side, e.g. distributed on each edge of this side.

According to a second aspect a data carrier is provided. The data carrier provides a counterfeit detection application adapted to perform the method steps according to the first aspect of the invention being stored on the data carrier. The counterfeit detection application can be installed on a portable device on demand from the data carrier. The data carrier itself might be any data carrier known to skilled people.

According to a third aspect a portable device is provided. The portable device comprises a camera, an adapted band pass filter arranged in the light path of the camera, where the adapted band pass filter comprises narrow band transmission windows in the infrared and/or ultraviolet wavelength range and a transmission window covering the visible wavelength range, and a counterfeit detection application installed on the portable device to check an object comprising hidden features suitable for a counterfeit detection against counterfeiting, where the counterfeit detection application is adapted to perform the method steps according to the first aspect of the present invention. Portable devices can be handheld devices.

The portable device according to the present invention enables counterfeit detection with the portable device in bright environments in an easy and reliable way not limited to certain locations.

In an embodiment of the portable device is a mobile phone, a tablet PC or a camera. These portable devices provide a required processor to implement and execute the counterfeit detection application, a data storage to store the counterfeit detection application as well as the required hardware component such as the camera, processor etc. to perform the authentication process according to the present invention. In an embodiment the camera is a standard camera for portable devices not being adapted in any particular way for taking the pictures of the object.

In an embodiment the camera and its camera function is controlled by the counterfeit detection application in order to take multiple pictures from the object to be combined to a single combined image improving the image quality of the taken pictures as well as the required number and sequence of the multiple taken pictures in order to improve the quality of the combined image.

In an embodiment the portable device further comprises a cover holding the portable device comprising a guiding structure being adapted to maintain a defined distance and tilting angle between the camera facing towards the object to support taking multiple pictures of the object with the same distance and tilting angle during relatively moving the portable device along the object to enable combining of the multiple pictures to a single combined picture with improved quality. The cover enables to provide guiding structures to any portable device to support the counterfeit detection method. The guiding structure supports the quality of the sequence of pictures taken for later combining by defining a fixed distance to the object and defined shading properties of ambient light during taking the pictures.

According to a fourth aspect a cover is provided. The cover is adapted to receive a portable device according to the present invention, further comprising a guiding structure adapted to maintain a defined distance and tilting angle between a camera of the portable device facing towards an object to be checked against counterfeiting and the object in order to support taking multiple pictures of the object with the same distance and tilting angle during relatively moving the cover with received portable device along the object to enable combining of the multiple pictures to a single combined picture with improved quality. The cover enables to provide guiding structures to any portable device to support the counterfeit detection method. The cover according to the present invention supports the quality of the sequence of pictures taken for later combining by defining a fixed distance to the object and defined shading properties of ambient light during taking the pictures.

It shall be understood that a preferred embodiment of the invention can also be any combination of the dependent claims with the respective independent claim.

Further advantageous embodiments are defined below.

BRIEF DESCRIPTION OF THE DRAWINGS

These and other aspects of the invention will be apparent from and elucidated with reference to the embodiments described hereinafter.

The invention will now be described, by way of example, based on embodiments with reference to the accompanying drawings.

In the drawings:

FIG. 1 shows a principle sketch of an embodiment of the portable device according to the present invention.

FIG. 2 shows a principle sketch of moving the portable device according to the present invention along the object in order to take multiple pictures.

FIG. 3 shows a principle sketch of an embodiment of the data carrier according to the present invention.

FIG. 4 shows a principle sketch of an embodiment of the cover according to the present invention in (a) a top view and (b) a side view.

FIG. 5 shows an example of a transmission spectrum of the adapted band pass filter according to the present invention.

FIG. 6 shows a principle sketch of an embodiment of the method according to the present invention.

In the Figures, like numbers refer to like objects throughout. Objects in the Figs. are not necessarily drawn to scale.

DETAILED DESCRIPTION OF EMBODIMENTS

Various embodiments of the invention will now be described by means of the Figures.

Figure 1:
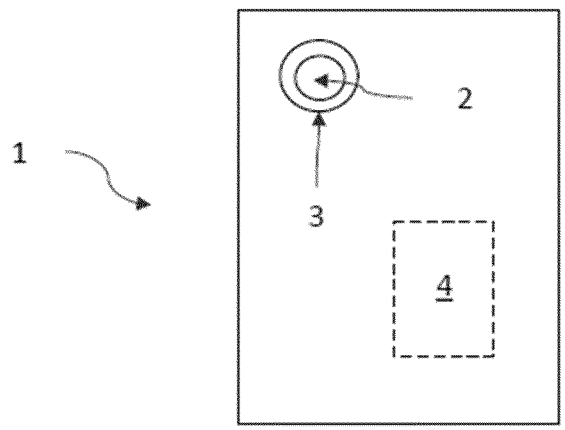

FIG. 1 shows a principle sketch of an embodiment of the portable device 1 according to the present invention comprising a camera 2, an adapted band pass filter 3 arranged in the light path of the camera 2, where the adapted band pass filter 3 comprises narrow band transmission windows 31 in the infrared and/or ultraviolet wavelength range and a transmission window 32 covering the visible wavelength range, and a counterfeit detection application 4 installed on the portable device 1 to check an object 10 comprising hidden features suitable for a counterfeit detection against counterfeiting, where the counterfeit detection application 4 is adapted to perform the method steps according to the present invention. The portable device 1 might be a mobile phone, a tablet PC or a camera. The camera 2 might be a standard camera for portable devices not being adapted in any particular way for taking the pictures of the object 10. The camera 2 and its camera function might be controlled by the counterfeit detection application 4 in order to take multiple pictures from the object 10 to be combined to a single combined image.

Figure 2:
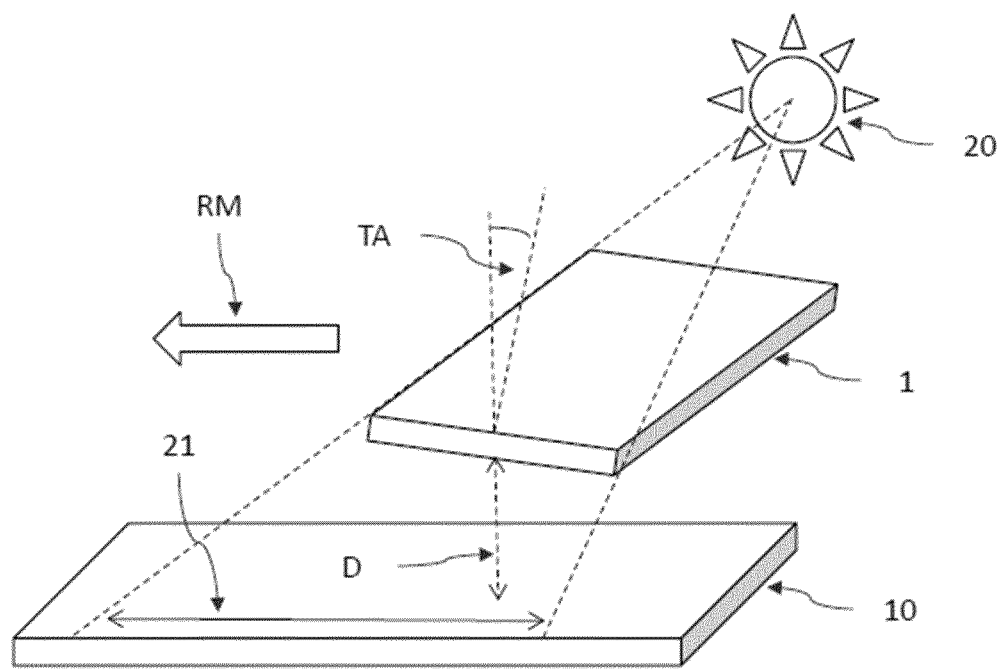

FIG. 2 shows a principle sketch of moving the portable device according to the present invention along the object in order to take multiple pictures from at least a portion of the object 10 with the camera 2 of the portable device 1 positioned in front of the object 10 during relatively moving RM the portable device 1 along the object 10. In order to shield at least a part of ambient light from the object 10 and the camera 2 the portable device 1 is placed in close distance D above the object 10 between object 10 and the ambient light source 20, where the closest possible distance is determined by the depth of focus of the camera 2 of the portable device 1. When moving RM the portable device 1 along the object, the portable device may be tilted relative to the surface of the object by a tilting angle TA eventually affecting the quality of the taken pictures. The tilting angle denotes the angle between the optical axis of the camera of the portable device and the vertical of the object. Therefore, a step of merging 125 the multiple images to the same distance D and same tilting angle TA might be performed by the counterfeit detection application 4 before combining all pictures to a combined image.

Figure 3:
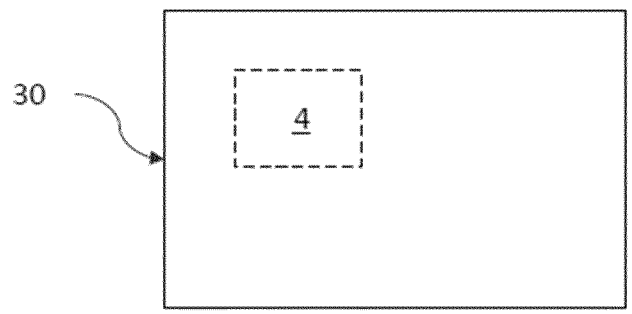

FIG. 3 shows a principle sketch of an embodiment of the data carrier according to the present invention. The data carrier 30 stores the counterfeit detection application 4 adapted to perform the method steps according to the first aspect of the invention.

Figure 4:
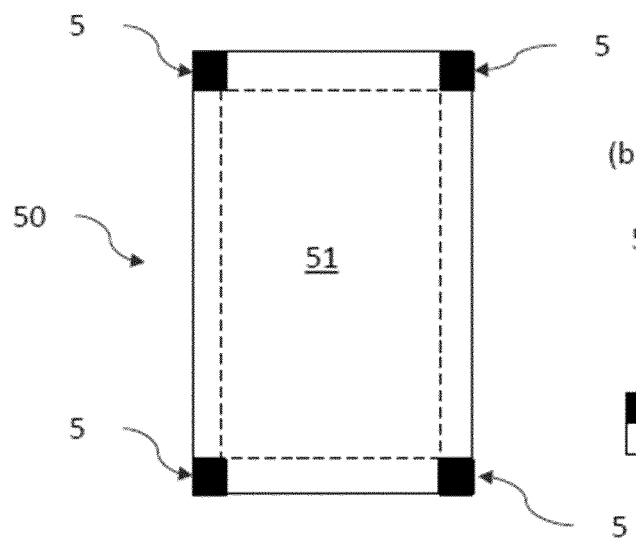
Figure 4:
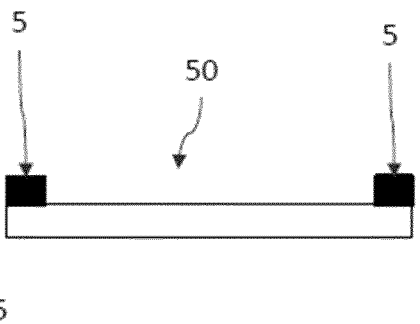

FIG. 4 shows a principle sketch of an embodiment of the cover according to the present invention in (a) a top view and (b) a side view. The cover 50 is adapted to receive a portable device 1 according to the present invention further comprising a guiding structure 5 adapted to maintain a defined distance D and tilting angle TA between a camera 2 of the portable device 1 facing towards an object 10 to be checked against counterfeiting and the object 10 in order to support taking multiple pictures of the object 10 with the same distance D and tilting angle TA during relatively moving the cover 10 with received portable device 1 along the object 10 to enable combining of the multiple pictures to a single combined picture with improved quality.

Figure 5:
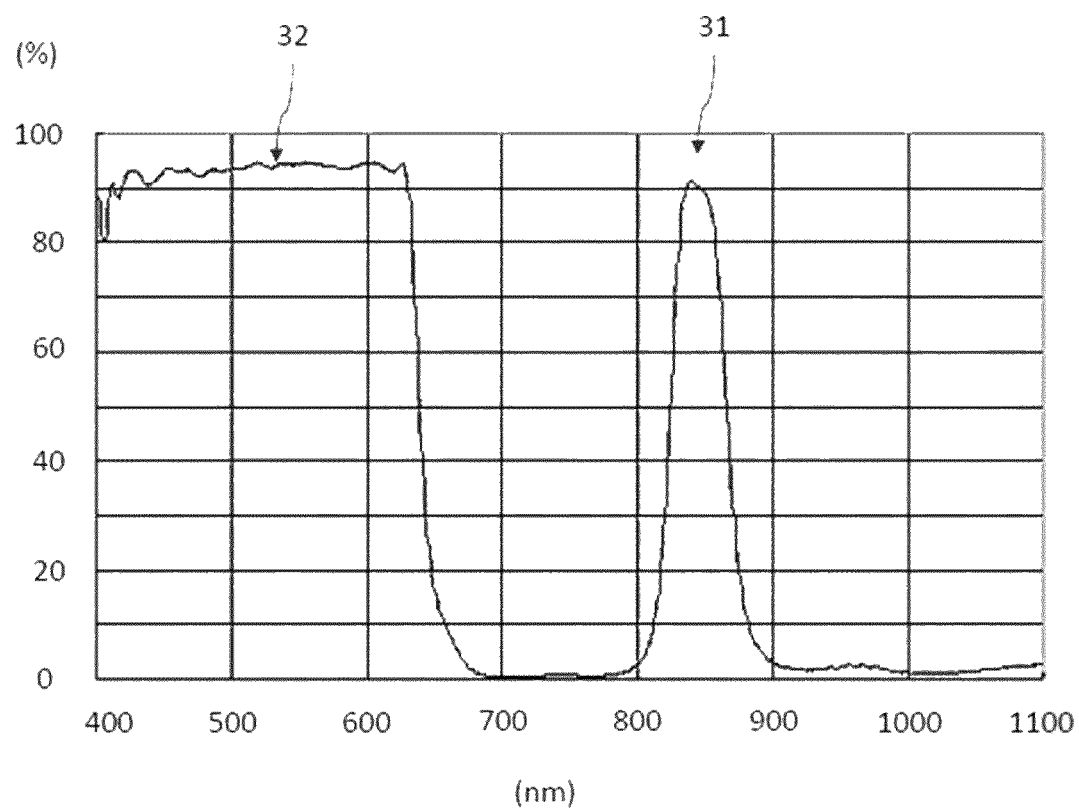

FIG. 5 shows an example of a transmission spectrum of the adapted band pass filter according to the present invention as a visible and infrared pass filter with a transmission window 32 ranging from about 400 nm to about 650 nm in the visible wavelength range and a transmission window 31 from about 810 nm to 880 nm in the infrared wavelength range. The wavelengths are given as x-axis in "nm". The y-axis denotes the transmission in percentage of full transmission. Another examples would be infrared narrow bandpass filter with a transmission maximum at 850 nm and a so-called full width half maximum (FWHM) of 30 nm, 40 nm or 50 nm. Another examples would be ultraviolet (UV) bandpass filter with a transmission maximum between 300 nm and 350 nm and transmission windows ranging from 250 nm to 400 nm, e.g. XNite330, XNite330C or XNiteUVR filters. The latter also comprises an infrared transmission window above 650 nm.

Figure 6:
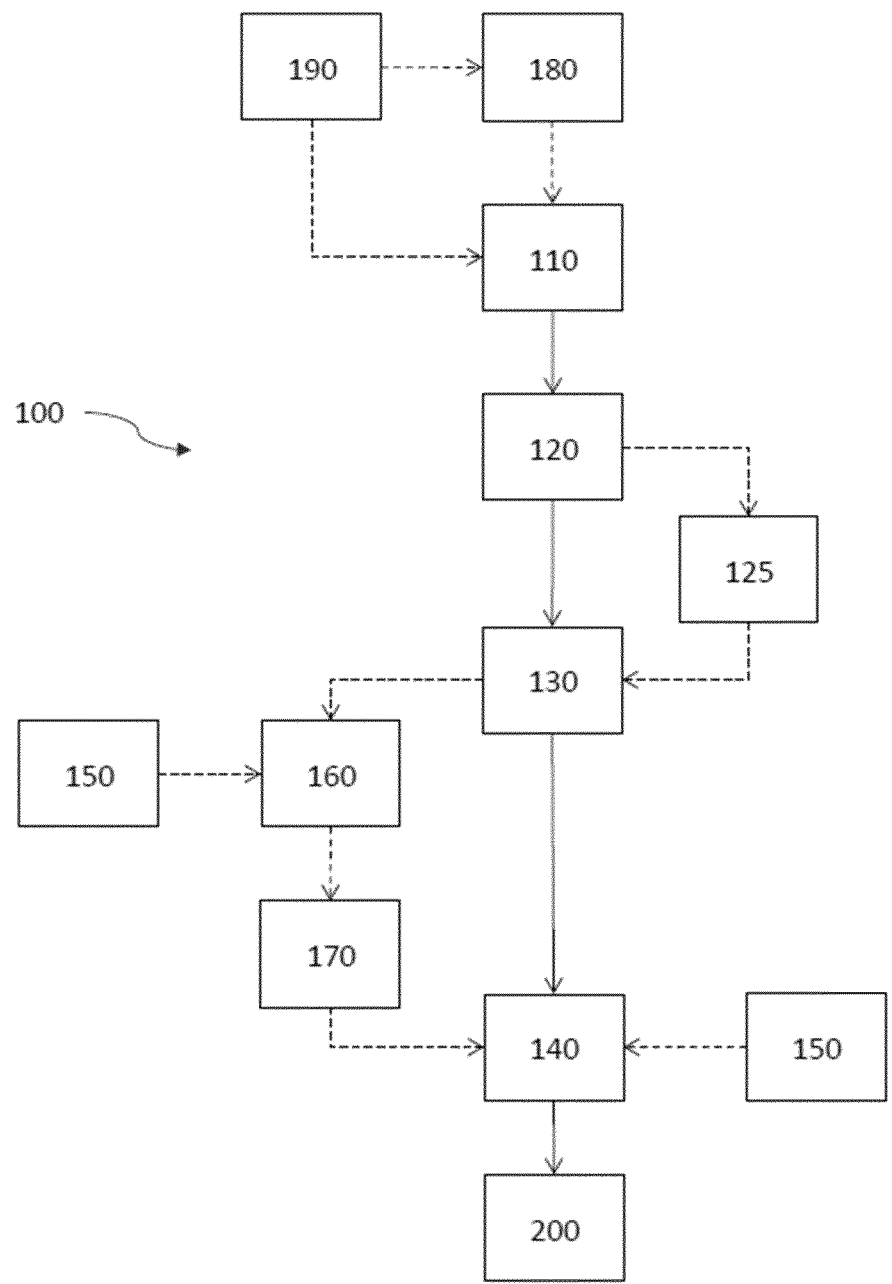

FIG. 6 shows a principle sketch of an embodiment of the method 100 according to the present invention. The method 100 for counterfeit detection uses a portable device 1 as shown in FIGS. 1 and 2. The method 100 comprises the steps of taking multiple overlapping pictures 110 from at least a portion of the object 10 with the camera 2 of the portable device 1 positioned in front of the object 10 during relatively moving RM the portable device 1 along the object 10, where the step of taking multiple overlapping images 110 might be executed and controlled by the counterfeit detection application 4 followed by combining 120 all taken pictures to a single combined image of at least the portion of the object 10 with increased resolution by the counterfeit detection application 4 executed on the portable device 1, where this step may comprises the step of merging 125 the multiple images to the same distance D and/or tilting angle TA between camera 2 and object 10 by the counterfeit detection application 4 followed by applying image processing 130 to the combined image by the counterfeit detection application 4 providing an improved image with improved properties compared to the combined image to order to visualize or enhance the hidden features of the object 10 comprising an increased contrast in the infrared and/or ultraviolet wavelength range being transmitted by the adapted band pass filter 3, where the image processing 130 is applied by the counterfeit detection application 4 with respect to at least one element of the group of elements comprising grayscale, contrast, brightness and application of high frequency pass filters to order to visualize or enhance the hidden features of the object and followed by comparing 140 the improved image with the visualized or enhanced hidden features of the object 10 with a reference image of the object 10 comprising the hidden features by the counterfeit detection application 4 to provide 190 an authentication result for the performed counterfeit detection, where the reference image might be obtained from a library comprising multiple different reference images, preferably installed on the portable device 1 or being downloaded from the library as an external library via the internet. The method may further comprise the steps of performing a similarity check between the combined image and the available reference images in the library by the counterfeit detection application and using the reference image of the library providing a highest degree of similarity above a predefined threshold with the combined image for performing the comparing step. For taking the multiple pictures 110 at least a part of ambient light might be shielded from object 10 and camera 2 by placing the portable device 1 in close distance D between the object 10 and the ambient light source 20, where the closest possible distance is determined by the depth of focus of the camera 2 of the portable device 1. To start the method with good accuracy the portable device 1 might be placed 180 in a guiding structure 5 in order to maintain a defined distance D and tilting angle TA between the camera 2 of the portable device 1 facing towards the object 10 and the object 10 for the step of taking the multiple overlapping pictures 110.

In case of portable device allowing visible (or ambient) light the step of taking the pictures of the object 110 comprise taking a set of a first and a second picture for each picture. First pictures are taken with only ambient light and second pictures will be taken with ambient light and special light (IR and/or UV light light). The order of these two images can be interchanged. Also pictures needing longer exposure times can be taken first so that chances of change in the ambient can be minimized. Special (IR and UV light) environmental conditions should be same in first and second image. In a following step the first picture with "Ambient light only" is subtracted from the second picture with "Ambient light+'IR and UV light" to provide a resulting picture allowing to provide an improved image for counterfeit detection.

While the invention has been illustrated and described in detail in the drawings and the foregoing description, such illustration and description are to be considered illustrative or exemplary and not restrictive.

From reading the present disclosure, other modifications will be apparent to persons skilled in the art. Such modifications may involve other features which are already known in the art and which may be used instead of or in addition to features already described herein.

Variations to the disclosed embodiments can be understood and effected by those skilled in the art, from a study of the drawings, the disclosure and the appended claims. In the claims, the word "comprising" does not exclude other elements or steps, and the indefinite article "a" or "an" does not exclude a plurality of elements or steps. The mere fact that certain measures are recited in mutually different dependent claims does not indicate that a combination of these measures cannot be used to advantage.

Any reference signs in the claims should not be construed as limiting the scope thereof.

LIST OF REFERENCE NUMERALS

1 portable device
2 camera of portable device
3 adapted band pass filter arranged in the light path of the camera
31 narrow band transmission windows in the infrared and/or ultraviolet wavelength range
32 a transmission window covering the visible wavelength range
4 counterfeit detection application
5 guiding structure
10 object
20 ambient light source
21 shaded area
30 data carrier providing a counterfeit detection application
50 cover for portable devices comprising the guiding structure
51 area for covering the portable device
100 method for counterfeit detection using a portable device
110 taking multiple overlapping pictures from at least a portion of the object with the camera of the portable device
120 combining all taken pictures to a single combined image
125 merging the multiple images to the same distance and/or tilting angle between camera and object by the counterfeit detection application
130 applying image processing to the combined image by the counterfeit detection application
140 Comparing the improved image with a reference image of the object
150 obtaining the to-be-compared reference image from a library
160 Performing a similarity check between the combined image and the available reference images
170 Using the reference image of the library providing a highest degree of similarity above a predefined threshold with the combined image for performing the comparing step
180 shielding part of ambient light with the portable device
190 placing the portable device in a guiding structure
200 providing an authentication result for the performed counterfeit detection
D distance between the portable device and the object
RM relatively moving the portable device along the object
TA tilting angel between portable device and object

The invention claimed is:

1. A method for counterfeit detection using a portable device comprising a camera, an adapted band pass filter arranged in the light path of the camera and a counterfeit detection application installed on the portable device to check an object comprising hidden features suitable for the counterfeit detection against counterfeiting, where the adapted band pass filter comprises narrow band transmission windows in the infrared and/or ultraviolet wavelength range and a transmission window covering the visible wavelength range, the method comprising the steps of:

taking multiple overlapping pictures from at least a portion of the object with the camera of the portable device positioned in front of the object during relatively moving the portable device along the object, wherein taking the pictures comprises taking a first image and a second image for each picture, the first image taken with ambient light only and the second image taken with one or more of ambient light and IR and UV light, and subtracting the first image from the second image;

combining all taken pictures to a single combined image of at least the portion of the object with increased resolution by the counterfeit detection application executed on the portable device;

applying image processing to the combined image by the counterfeit detection application providing an improved image with improved properties compared to the combined image in order to visualize or enhance the hidden features of the object comprising an increased contrast in one or more of the infrared and ultraviolet wavelength range being transmitted by the adapted band pass filter; and comparing the improved image with the visualized or enhanced hidden features of the object with a reference image of the object comprising the hidden features by the counterfeit detection application to provide an authentication result for the performed counterfeit detection.

2. The method as claimed in claim 1, wherein the image processing is applied by the counterfeit detection application with respect to at least one element of the group of elements comprising grayscale, contrast, brightness and application of high frequency pass filters in order to visualize or enhance the hidden features of the object.

3. The method as claimed in claim 1, further comprising the step of obtaining the to-be-compared reference image from a library comprising multiple different reference images, preferably installed on the portable device or being downloaded from the library as an external library via the internet.

4. The method as claimed in claim 3, further comprising the steps of
performing a similarity check between the combined image and the available reference images in the library by the counterfeit detection application; and
using the reference image of the library providing a highest degree of similarity above a predefined threshold with the combined image for performing the comparing step.

5. The method as claimed in claim 1, wherein the step of taking multiple overlapping images is executed and controlled by the counterfeit detection application.

6. The method as claimed in claim 1, further comprising the step of shielding part of ambient light by placing the portable device in close distance to the object between the object and the ambient light source, where the closest possible distance is determined by the depth of focus of the camera of the portable device.

7. The method as claimed in claim 1, wherein the step of combining all taken pictures to the single combined image comprises one or more of the step of merging the multiple images to the same distance and tilting angle between camera and object by the counterfeit detection application.

8. The method as claimed in claim 1, further comprising the step of placing the portable device in a guiding structure in order to maintain a defined distance and tilting angle between the camera of the portable device facing towards the object and the object for the step of taking the multiple overlapping pictures.

9. A computer-readable data carrier comprising a counterfeit detection application including instructions which, when executed by a portable device, cause the portable device to carry out the method of claim 1.

10. A portable device comprising a camera, a light source to illuminate an object comprising hidden features suitable for a counterfeit detection against counterfeiting, an adapted band pass filter arranged in the light path of the camera, where the adapted band pass filter comprises narrow band transmission windows in the infrared and/or ultraviolet wavelength range and a transmission window covering the visible wavelength range, and a counterfeit detection application installed on the portable device to check the object, where the counterfeit detection application is adapted to perform the method steps of claim 1.

11. The portable device of claim 10, wherein the portable device is a mobile phone, a tablet PC or a camera.

12. The portable device of claim 10, where the camera is a standard camera for portable devices not being adapted in any particular way for taking the pictures of the object.

13. The portable device as claimed in claim 10, wherein the camera and its camera function is controlled by the counterfeit detection application in order to take multiple pictures from the object to be combined to a single combined image.

14. The portable device as claimed claim 10, further comprising a cover holding the portable device comprising a guiding structure being adapted to maintain a defined distance and tilting angle between the camera facing towards the object to support taking multiple pictures of the object with the same distance and tilting angle during relatively moving the portable device along the object to enable combining of the multiple pictures to a single combined picture with improved quality.

* * * * *